US012034909B2

(12) United States Patent
Elbakly et al.

(10) Patent No.: US 12,034,909 B2
(45) Date of Patent: Jul. 9, 2024

(54) ANY POSE MOTION CAPTURE CALIBRATION METHODS AND APPARATUS

(71) Applicant: Movella Holdings B.V., Enschede (NL)

(72) Inventors: Fouad Elbakly, San Jose, CA (US);
Magdalena Zych, San Jose, CA (US);
Joris Voerman, San Jose, CA (US)

(73) Assignee: Movella Holdings B.V., Enschede (NL)

( * ) Notice: Subject to any disclaimer, the term of this patent is extended or adjusted under 35 U.S.C. 154(b) by 118 days.

(21) Appl. No.: 17/932,972

(22) Filed: Sep. 16, 2022

(65) Prior Publication Data

US 2024/0098246 A1 Mar. 21, 2024

(51) Int. Cl.

| H04N 17/00 | (2006.01) |
| G01P 15/18 | (2013.01) |
| G01P 21/00 | (2006.01) |
| G06T 7/292 | (2017.01) |
| G06T 7/55 | (2017.01) |
| G06T 7/70 | (2017.01) |

(52) U.S. Cl.
CPC ........... H04N 17/002 (2013.01); G01P 15/18 (2013.01); G01P 21/00 (2013.01); G06T 7/292 (2017.01); G06T 7/55 (2017.01); G06T 7/70 (2017.01); *G06T 2207/10016* (2013.01); *G06T 2207/30196* (2013.01); *G06T 2207/30204* (2013.01)

(58) Field of Classification Search
CPC ....... H04N 17/002; G01P 15/18; G01P 21/00; G06T 7/292; G06T 7/55; G06T 7/70; G06T 2207/10016; G06T 2207/30196; G06T 2207/30204
See application file for complete search history.

(56) References Cited

U.S. PATENT DOCUMENTS

| 9,842,254 B1* | 12/2017 | Brailovskiy | G06T 7/246 |
| 10,943,360 B1* | 3/2021 | Crozier | G01C 11/02 |
| 10,992,928 B1* | 4/2021 | Rehder | H04N 17/002 |
| 2012/0203487 A1* | 8/2012 | Johnson | G01C 25/005 |
| | | | 702/141 |
| 2017/0045736 A1* | 2/2017 | Fu | G02B 27/017 |
| 2018/0012377 A1* | 1/2018 | Dayal | G06T 7/80 |
| 2020/0033937 A1* | 1/2020 | Erivantcev | G06T 7/246 |
| 2020/0348765 A1* | 11/2020 | Gurovich | G06F 1/1698 |
| 2020/0387227 A1* | 12/2020 | Erivantcev | G06F 3/011 |
| 2021/0117722 A1* | 4/2021 | Kal | H04N 23/90 |
| 2021/0118218 A1* | 4/2021 | Huang | G01C 19/00 |
| 2021/0350604 A1* | 11/2021 | Pejsa | G06T 19/006 |
| 2021/0389829 A1* | 12/2021 | Erivantcev | H02J 7/342 |
| 2022/0413081 A1* | 12/2022 | Mahfouz | G01C 25/005 |
| 2023/0003528 A1* | 1/2023 | Santos | G01C 21/16 |

* cited by examiner

*Primary Examiner* — Jared Walker (57) ABSTRACT

A system includes an inertial measurement unit (IMU) associated with a user, wherein the IMU acquires acceleration data and determines gravity data during a period of time, wherein the IMU acquires magnetic orientation data and heading data during the period of time, and wherein the IMU outputs gravity data and heading data to a processing unit, a camera for acquiring images of the user including the IMU during the period of time, and the processing unit for determining an orientation of a portion of a model of the user in response to the images of the user, for determining calibration data for the portion of the model of the user in response to the orientation of the portion of the model, the gravity data, and the heading data.

20 Claims, 4 Drawing Sheets

ANY POSE MOTION CAPTURE CALIBRATION METHODS AND APPARATUS

BACKGROUND OF THE INVENTION

The present invention relates generally to apparatus for motion capture of physical performances of subjects. More specifically, the present invention relates to motion capture methods and apparatus with increased capability and flexibility.

With some motion capture systems, users attach specialized motion capture devices to multiple points on their body, and their motions are inferred by movement of the devices. To properly infer motions, all of these systems require a very specific calibration routine.

The inventors recognize that the calibration process is one of the major sources of error of inertial motion capture systems. It is also one that human error contributes greatly to. Specifically, calibration routines typically includes the human subjects being first required to assume a very specific physical pose (e.g. Leonardo da Vinci's The Vitruvian Man) and then holding that pose steady for a length of time.

Drawbacks to these calibration routines include that is impossible for some subjects to assume this idealized pose. For example, subjects in wheelchairs, the elderly, and those with physical injuries may not be able to position portions of their bodies into the required pose. Other drawbacks to these calibration routines include that is difficult for some subjects to hold this idealized pose for the required duration. For example, children, the infirm and those with neurodegenerative diseases may not be able to hold their bodies in the required pose for the required time. Any deviation from the idealized pose during the calibration process may lead to noticeable errors during the resulting motion capture performance.

In light of the above, what is desired are improved motion capture systems without the drawbacks described above.

BRIEF SUMMARY OF THE INVENTION

Embodiments of the present invention disclose motion capture systems and methods having advanced calibration functionality. The additional functionality greatly increases the value of motion capture systems as it expands the variety of subjects whose movements can now be captured. In some embodiments, arbitrary or user selected poses may be used for calibration of sensors in a motion capture system.

Some embodiments utilize multiple inertial measurement units (IMU) that are attached to the user at particular positions on the body, e.g. forearm, shin, hip, or the like. IMUs may include accelerometers, magnetometers, gyroscopes, or the like to measure orientation of the user in space. Additionally, the IMUs may include one or more visible markers, e.g. recognizable geometric patterns. Embodiments also typically include at least one video camera that can capture video data of the user, where some of the markers of IMUs are visible.

Embodiments also include a processing unit coupled to the IMUs and video camera. The processing unit typically includes a memory that stores a general model, e.g. physical and mechanical model, of the user as well as one or more programs that direct a processor to perform the herein described processing functions, among others. The processing unit receives data (e.g. acceleration, magnetic heading, rotational velocity, etc.) from the IMUs of the IMUs with respect to gravity and to a global magnetic field, and video data from the video camera. In some embodiments, based upon the IMU data, the video data, and the physical or mechanical model of the subject, the processor can perform calibration operations.

In various embodiments, the process may include the user positioning themselves in any arbitrary pose they are comfortable with. While in that arbitrary pose, the IMUs determine data (e.g. acceleration, rotational velocity, magnetic heading, etc.), and the video camera records video data of the user. Next, the process may include determining locations of the IMU marker from the video data, and performing a biomechanical optimization analysis (e.g. inverse kinematic analysis) to determine the arbitrary pose assumed by the user. Based upon the determined arbitrary pose and the IMU data, calibration parameters of the motion capture system are determined. In some embodiments, the calibration parameters take into account an offset rotation of the IMU sensor with regards to the portion of the user (e.g. segment), and in other embodiments, the calibration parameters may also take into account where the IMU sensor is attached along the specific portion (segment) of the user. Subsequently, based upon incoming IMU data and the calibration parameters, the motion (e.g. orientation, velocity, position, etc.) of the user may be properly determined.

According to one aspect, a method is disclosed. One technique may include, while a user is positioned in an arbitrary position, acquiring, with a first inertial measurement unit disposed upon a first portion the user, a first plurality of acceleration data and a first plurality of magnetic data, acquiring, with a second inertial measurement unit disposed upon a second portion the user, a second plurality of acceleration data and a first plurality of magnetic data, and acquiring, with a video camera, a plurality of image data of the user including the first portion of the user and the second portion of the user. A method may include determining, with the first inertial measurement unit, first gravity data of the first inertial measurement unit with respect to gravity, determining, with the first inertial measurement unit, first magnetic orientation data of the first inertial measurement unit with respect to a global magnetic field, determining, with the second inertial measurement unit, second gravity data of the second inertial measurement unit with respect to gravity, and determining, with the second inertial measurement unit, second magnetic orientation data of the first inertial measurement unit with respect to the global magnetic field. A process may include determining, with a processing unit coupled to the video camera, an orientation of the first portion of the user in space and an orientation of the second portion of the user in space, determining, with the processing unit coupled to the first inertial measurement unit, a calibration orientation of the first inertial measurement unit in space in response to the first gravity data, the first magnetic orientation data, and the orientation of the first portion of the user in space, and determining, with the processing unit coupled to the second inertial measurement unit, a calibration orientation of the second inertial measurement unit in space in response to the second gravity data, the second magnetic orientation data, and the orientation of the second portion of the user in space.

According to another aspect, a motion capture system is described. One apparatus may include a first inertial measurement unit disposed upon a first portion the user, wherein the first inertial measurement unit includes a first visual marker, wherein the first inertial measurement unit is configured to acquire a first plurality of acceleration data and a first plurality of magnetic data during a period of time, wherein the first inertial measurement unit is configured to determine first gravity data in response to the first plurality of acceleration data, configured to determine first magnetic orientation data in response to the first plurality of magnetic data, and configured to wirelessly output the first magnetic orientation data and the first plurality of magnetic data to a processing unit, and a second inertial measurement unit disposed upon a second portion the user, wherein the second inertial measurement unit includes a second visual marker, wherein the second inertial measurement unit is configured to acquire a second plurality of acceleration data and a second plurality of magnetic data during the period of time, wherein the second inertial measurement unit is configured to determine second gravity data in response to the second plurality of acceleration data, and configured to determine second magnetic orientation data in response to the second plurality of magnetic data, and configured to wirelessly output the second magnetic orientation data and the second plurality of magnetic data to the processing unit. A device may include a video camera configured to acquire a plurality of image data of the user including the first portion of the user and the first visual marker and the second portion of the user and the second visual marker during the period of time. A system may include a processing unit coupled to the first inertial measurement unit, the second inertial measurement unit, and to the video camera, wherein the processing unit is configured to determine a pose of the user in response to the plurality of image data, wherein the processing unit is configured to determine first calibration data associated with the first inertial measurement unit in response to the first magnetic orientation data, the first plurality of magnetic data, and the pose of the user, and wherein the processing unit is configured to determine second calibration data associated with the second inertial measurement unit in response to the second magnetic orientation data, the second plurality of magnetic data, and the pose of the user.

DETAILED DESCRIPTION

The present invention relates generally to apparatus for motion capture of physical performances of subjects. More specifically, the present invention relates to motion capture methods and apparatus with increased capability and flexibility.

Figure 1:
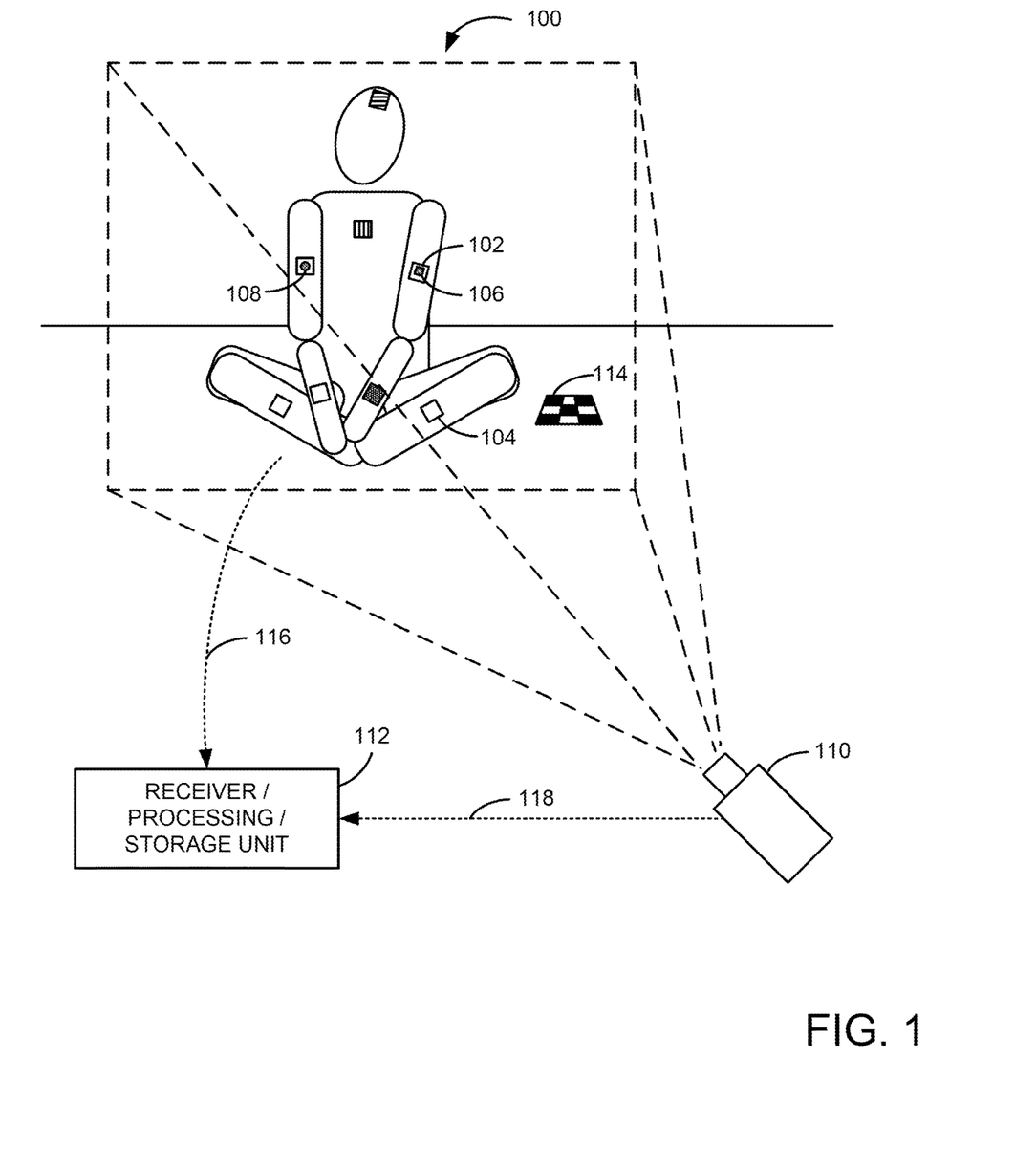
FIG. 1 illustrates an operational overview according to some embodiments.

FIG. 1 illustrates an operational overview of some embodiments of the present invention. In FIG. 1, a subject 100 is illustrated in a seated position. As can be seen, a number of inertial measurement units (IMUs) 102, 104, etc. are disposed upon different portions of subject 100. Each inertial measurement unit includes one or more visually distinctive portions, e.g. 106, 108. A video camera 110 is illustrated in FIG. 1, wherein subject 100 is within the field of view thereof. A processing unit 112 is also illustrated coupled to the IMUs 102 and 104 and video camera 110.

In some embodiments, IMUs 102, 104, etc. may include a processor and one or more multi-axis sensors such as: an accelerometer, a magnetometer, pressure sensors, gyroscopes, and the like. In such IMUs, the sensors are configured to provide raw data to the processor based upon movement or position of the IMUs as the subject moves or poses. In response, the processor is configured to process the sensor raw data to determine IMU orientation data such as: orientation of the IMU with respect to gravity, orientation of the IMU with respect to an external magnetic field (e.g. magnetic north), and the like.

In some embodiments, the visually distinct portion may have a predefined geometric shape, may have a predefined pattern of shapes, may have specific colors, and combinations of the above. As examples of this, an IMU positioned on the right hand of a subject may have green colored light or marker and an IMU positioned on the left hand of a subject may have red colored light or marker; an IMU positioned upon a forearm may have two colors or lights with blue towards the elbow and orange towards the hand and an IMU positioned near the chest may have a yellow light or marker; a first black and white calibration target may be positioned on the left thigh, and a different, second black and white calibration target may be positioned on the right thigh, and the like. In light of the herein disclosure, it is believed that one of ordinary skill in the art will understand many other designs, colors, orientations, and patterns for the IMU visible markers are within the scope of embodiments of the present invention. Also illustrated is a calibration target 114 that may have a known size and may be located near subject 100.

In some embodiments, IMUs 102, 104, etc. include a wired or wireless data output that allows the IMU to provide 116 the orientation data to processing unit 112. In some cases, an IMU may include short-range transmitter such as a Bluetooth, ultrawide-band (UWB), Wi-Fi, or the like. In other cases, the IMU may include an electrical or optical interface for communication purposes. Various embodiments of the present invention may be embodied as an MTi-610 IMU, MTw2 or the like from Xsens. In other embodiments, IMUs from other vendors may be used.

In various embodiments, video camera 110 may be a dedicated video camera, a video camera integrated into a smartphone, or the like. Video camera 110 is typically used to capture images of a subject during a calibration phase as described herein. In some embodiments, the video camera may include RBG sensors, monochromatic sensors, or the like. Video camera 110 may output 118 video data to processing unit 112 via wired or wireless interface. In some embodiments, multiple video cameras, a video camera with a micro lens array, lidar, or the like may be used to capture multiple views of the subject during the calibration phase. These multiple views may then be used to determine geometric data (e.g. depth, position, orientation, etc.) of the subject based upon processing of the multiple views. In some embodiments, these geometric data may also be used in the biomechanical optimization analysis discussed herein.

Processing unit 112 is typically physically separated from the IMUs, i.e. IMUs are typically self-contained devices. In some embodiments, processing unit 112 may also be physically separated from video camera 110 (e.g. a webcam coupled to a desktop computer), although in other embodiments, video camera 110 and processing unit 112 may be within a single device, such as a smartphone, a tablet, a laptop computer, or the like. Processing unit 112 typically includes a microprocessor or other processor and a memory for storage of programs executable by the processor and other data, as disclosed herein (e.g. a biomechanical model of a subject). Additionally, processing unit 112 may include a wired or wireless interface to communicate with IMUs and video camera 110. In some embodiments, processing unit 112 may include individual components that are coupled to each other via separate or a shared interface, or the like. As an example, processing unit 112 may include a receiving unit designed to receive data communications from multiple IMUs via a wired (e.g. USB, proprietary protocol, etc.) or wireless (e.g. Bluetooth, proprietary protocol) interface, wherein the receiving unit is coupled to a processing unit (e.g. a laptop computer) via a wired (e.g. USB) or wireless (e.g. Bluetooth) interface, and wherein the processing unit is coupled to a local memory (e.g. laptop memory) or a remote memory (e.g. cloud-based storage) via a wired (e.g. Ethernet) or wireless (e.g. Wi-Fi) interface.

Figure 2A:
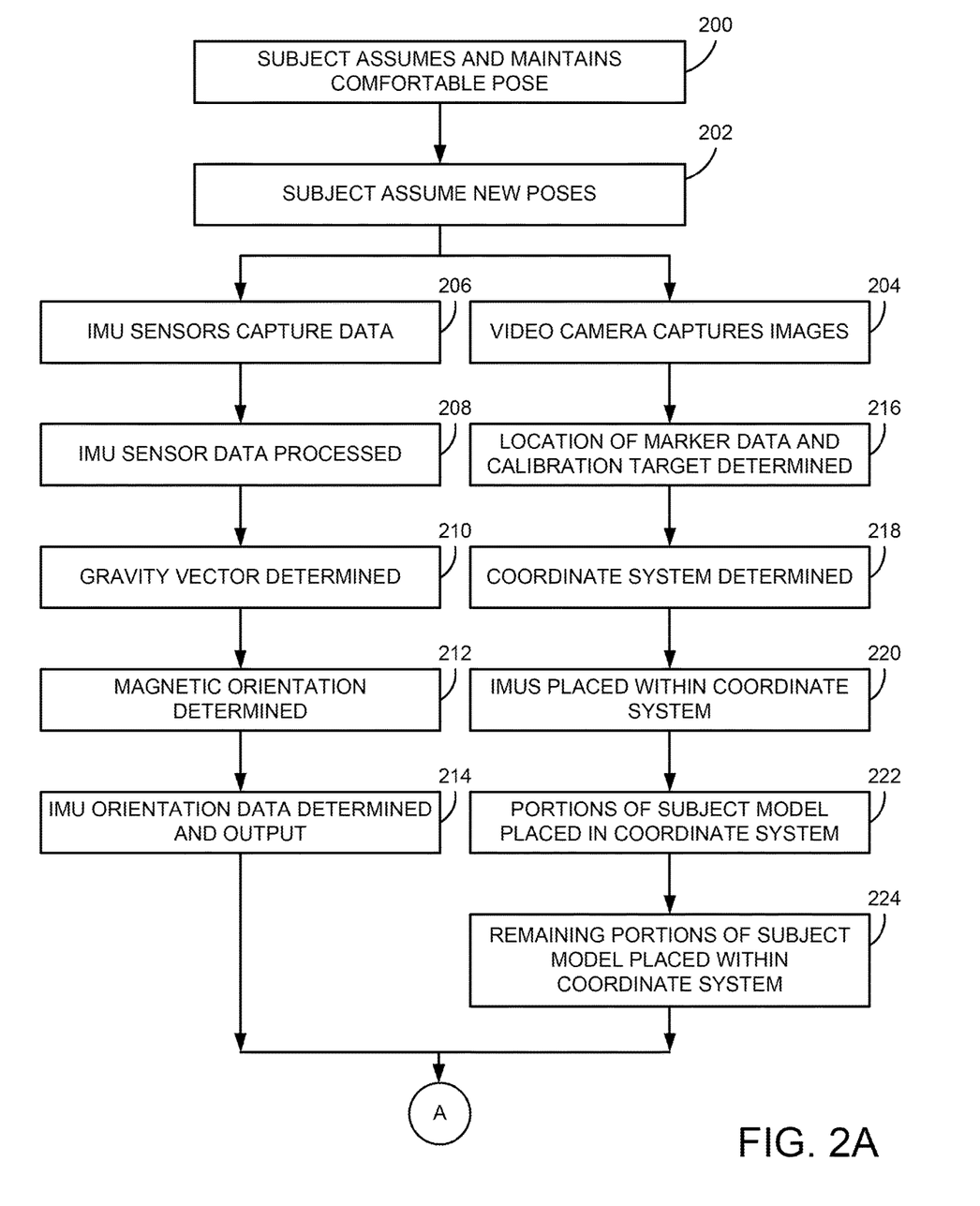
FIGS. 2A and 2B illustrate a process diagram according to additional embodiments.
Figure 2B:
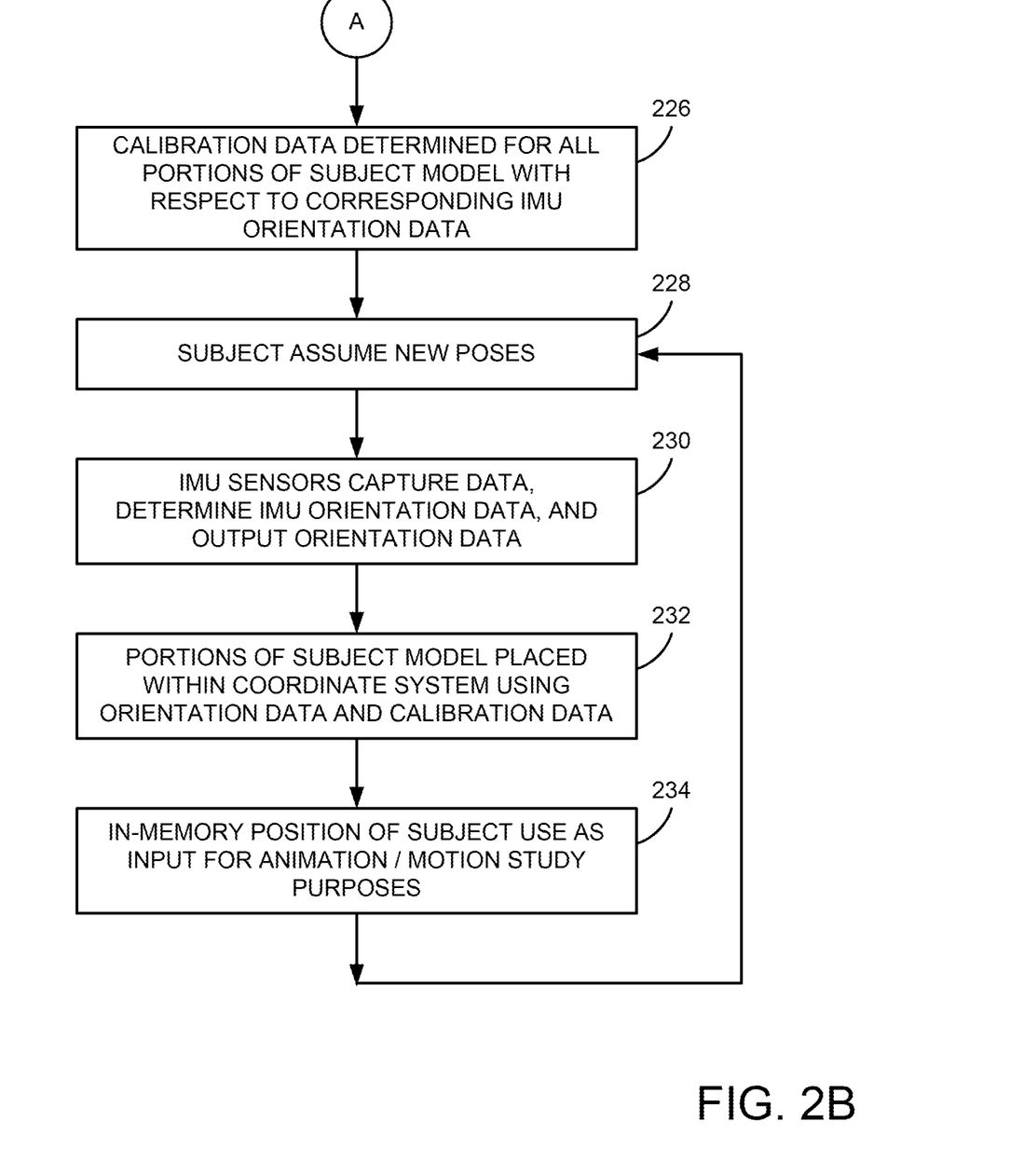

FIG. 2 illustrates a process flow diagram according to some embodiments. More specifically, FIG. 2 illustrates processes performed by the various electrical hardware components described above, and others.

Initially, IMUs such as those described above are attached to a subject at specific locations, step 200. In some cases IMUs include straps, button, tape and other mechanisms which are used to attach to the subject. In some cases, IMUs may be attached to a garment which is worn by the subject. The IMUs are typically positioned to locations on the subject such as the chest, hips, hands, and the like.

Next, he subject may be told to get comfortable and assume any pose they can comfortably hold for a short period of time, step 202. For example, a person in a wheelchair may be seated with their hands on the arm rests; in another example, a child may be seated in a cross-legged (e.g. crisscross applesauce) pose with their hands on their lap; in another example, a person suffering from a degenerative nerve disease may lean against a wall or another person; and the like.

In various embodiments, while the subject holds the comfortable pose, the following steps may be performed at about the same time, one after the other, or the like: a video camera captures images of the subject, step 204, and the IMUs capture physical data, step 206.

As discussed above, IMUs typically include one or more markers (e.g. patterns, lights, etc.). It is generally desired that in step 204, one or more of the markers for one or more of the IMUs be visible to the video camera. The images acquired by the video camera typically includes at least some these visual markers.

In various embodiments, while the subject holds the comfortable pose, the IMUs may record data from its sensors. Typical types of sensors includes accelerometers, magnetometers, gyroscopes, or the like, and may be one-axis or multi-axis devices. Output data from the sensors may be in the form of a stream of sensor data, packets of sensor data, or the like.

In response to the acquired sensor data, one process performed by IMUs may include a noise reduction step, step 208. In particular, as the sensors are extremely sensitive, the sensor data may capture motion data unimportant for calibration purposes, such as the heartbeat, blood pumping, breathing, trembling, and the like. In this step, such data may be filtered out, for example using data averaging techniques, low-pass filters, and the like. This processing is typically performed by a dedicated processor within each IMU.

In some embodiments, the dedicated processor may determine the orientation of the IMU with respect to gravity, step 210 and the orientation of the IMU with respect to a global magnetic field, step 212. In some examples, in step 208, the orientation (gravity vector) of the IMU with respect to gravity is determined based upon the known geometry and placement of the accelerometers within the IMU and the sensor data reflecting the force of gravity acting upon the one or more accelerometers. Additionally, in step 212, the orientation (e.g. magnetic vector) of the IMU with respect to a global magnetic field (e.g. Magnetic North) is determined based upon the known geometry and placement of the magnetometers within the IMU and the sensor data reflecting the force of Magnetic North acting upon the one or more magnetometers. The inventors are aware of multiple techniques for processing such sensor data to determine the IMUs orientation with respect to the global frame (e.g. gravity, magnetic north)

In various embodiments, the gravity data and the magnetic data may then be output to an external processor, step 214. As discussed above, this data may be transmitted via wires, e.g. via a serial or parallel interface, a standardized or custom physical wiring interface, or the like. Additionally or alternatively, the data may be transmitted wirelessly, e.g. via Bluetooth, Ultrawide band (UWB), ZigBee, from each of the IMUs to the external processing unit.

In various embodiments, the images of the subject in the comfortable pose acquired by the video camera are provided to processing unit. Similar to the above, the video camera may provide the video data to the processing unit via a wired or wireless interface. In some embodiments, the video camera and the processing unit are part of a smart device, e.g. smart phone, tablet, laptop computer, or the like. The processing unit may include a memory for storing the video data, storing executable programs, a model of the user, and the like.

In various embodiments, a model of the subject may be a software model of the subject's body including physical and mechanical constraints. For example, for a human subject, the model will typically include two arms, two legs, one head, a torso, and the like. The level of detail for the model can vary depending upon specific engineering and motion capture accuracy preference. Additionally, the model will typically include orientation constraints to rigid portions of the model. For example, knees may not normally bend forward, elbows will not normally fold downwards, and the like. Models may be different for different subjects. For example for very flexible subjects, "normal" constraints between rigid portions may be relaxed, or the like.

In some embodiments, the following steps may be used by the processing unit to determine a model pose of the subject in the comfortable pose. Initially, the image position of the visible IMU markers in the series of acquired images are determined, step 216. In some cases, this may include determining bright pixels within an image that correspond to visually captured IMU markers in the image.

In some embodiments, when the series of images of the subject are taken, one or more coordinate system markers may also be acquired. These coordinate system markers may, for example, be a three-dimensional cube or corner square placed next to or near the subject. In step 216, the image locations, size, lengths, orientation and the like, of these coordinate system markers can also be determined.

Next, in some examples, an in-memory (in the processing unit memory) coordinate system for the images may be created based upon the location, size, lengths, and the like, of the coordinate system markers captured in the images, step 218. In some cases, the relationship among image locations of video camera images, physical sizes of coordinate system markers, distances between the video camera to objects, and the like may be computed ahead of time. Such data may be used when setting up the in-memory coordinate system and for the following processing steps.

In various embodiments, the IMUs are placed within the in-memory coordinate system based upon the coordinate system, step 220. These in-memory locations of the IMUs may be determined based upon the known size, length, orientation, and the like, of the IMU markers as they appear in the images. The locations of the IMUs in the in-memory coordinate system may then be processed or filtered to remove undesired jitter, or other high-frequency artifacts, between the multiple images of the captured video.

In various embodiments, specific body portions of a biomechanical model of the subject are placed within the in-memory coordinate system, step 222. As noted above, in some embodiments, IMU markers are unique and can be distinguished within the captured images. For example, a first IMU may have a red light next to a green light, a second IMU may have a blue light next to an orange light, and the like. Further, a correspondence between the IMU markers and which physical position of the subject the IMU markers are known. Continuing the examples above, the first IMU may be positioned on the right forearm, and the red light of the first IMU may be closer to the right wrist than the green light, and the second IMU may be positioned on the left forearm, and the blue light of the second IMU may be closer to the left wrist than the orange light, and the like. Accordingly, in this step, portions of the model that correspond to the specific, visible IMUs are placed within the in-memory coordinate system. As an example, the model right arm may point towards the video camera, the model left arm may point away from the video camera, and the like. As there may be multiple IMUs visible in the video images, multiple portions of the model may be placed with the in-memory coordinate system.

In some possible embodiments, based upon the in-memory positions of the model of the subject is computed, step 224. In some cases, a biomechanical optimization analysis is performed to determine a pose for the model such that the locations of the portions of the model that are placed in step 221 are maintained and the constraints of the model are maintained. In some embodiments, a result of this process is an estimated pose for the subject as reflected by the posed biomechanical model. As an example, if a right forearm and a left forearm of a subject are folded across the subject's chest, in step 222, the right forearm and the left forearm of a may be placed within the in-memory coordinate system. An IMU on the subject's upper left arm may not be visible, thus not initially placed. Then in some embodiments, in step 224, the estimated position, orientation, and the like of the subject's upper left arm is inferred within the model.

Next, in some embodiments, the calibration of the IMUs for the subject in the comfortable pose are determined and saved, step 226. In particular, the orientations, etc. of placed portions of the model are known and associated with the gravity vector and magnetic vector data of the observed IMU, for example. In some embodiments, the calibration data of the IMUs may include angular calibration offsets, in three-degrees, between the IMU orientation as it positioned upon the portion of the user (i.e. segment). In some cases, the orientations, etc. of the portions of the model that were computed are also associated with gravity vector and magnetic vector data (e.g. angular calibration offsets) of IMUs that are associated with the inferred model portion. As an example, a user is squatting and IMU1 (on a thigh) and IMU3 (on a foot) are visible and are placed in step 222, and IMU2 (on a shin is not visible). In step 224, the orientation of the shin of the model may be inferred (i.e. a best guess), and associated with IMU2. Then in this step, the gravity and magnetic data of IMU2 (e.g. angular calibration offsets) that are computed above can then associated with the inferred orientation of the model of the shin.

In some embodiments, the calibration data of the IMUs may also include a specification of position along the portion of the user where the IMU is placed. For example, based upon the video images, it can be approximately determined where the IMU is positioned along an arm, e.g. is it positioned closer to the elbow or wrist?

In various embodiments, as the subject subsequently moves, the collected IMU data is used to determine the motion of the subject in-memory, step 228. In particular, as the processing unit acquires new IMU data, the calibration data maintained in step 226 is used to determine how the model of the subject changes relative to the calibration data (e.g. gravity and magnetic heading data in the comfortable position), step 230.

Based upon this movement data, the model may be used for many purposes such as, animation purposes, movement study purposes, athletic or rehabilitation purposes, and the like, step 232. For example, as the subject moves or assumes another pose, and the IMUs determines and provides data to the processing unit, and in response to the IMU data, the calibration data, and the like, the positions of the subject is determined and stored in memory, step 232.

In various embodiments, the positions of the subject in memory may be used as input data for computer-generated graphics animation and models, step 234. For example, the in-memory positions may be used to automatically pose characters in a video game, may be used as a basis of characters in an animated feature, may be used for motion studies or ergonomics studies, may be used for subject movement characterization, and the like. In some embodiments, the external processor may output the stored positions of the subject from memory to an animation server or other computer. In some examples, the other computer may then animate a computer generated object based upon those stored positions and render output images; the other computer may compare the stored positions to normal user positions to determine anomalies in the movement of the subject; and the like.

Figure 3:
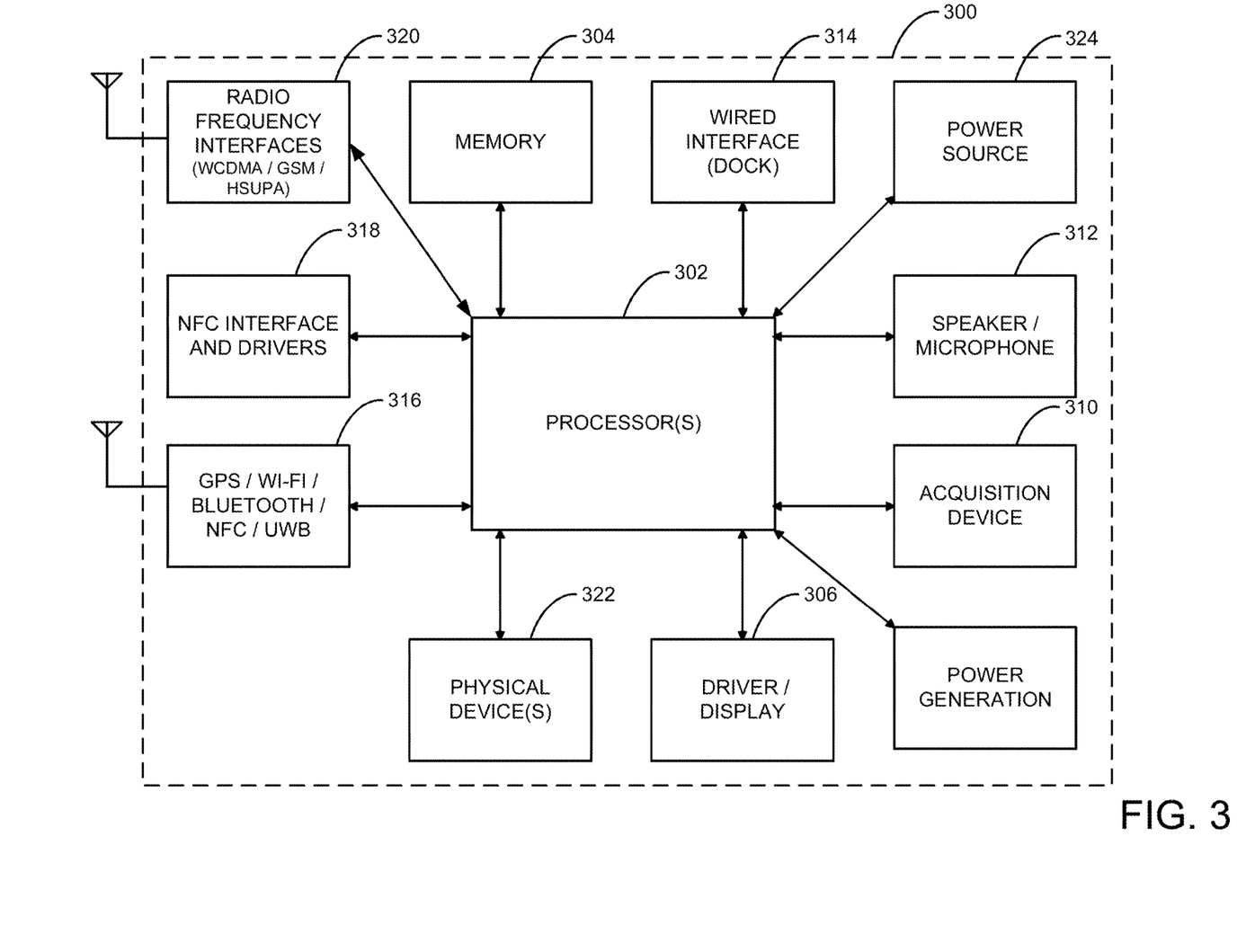
FIG. 3 illustrates a functional block diagram according to various embodiments.

FIG. 3 illustrates a functional block diagram of various embodiments of the present invention. More specifically, it is contemplated that user smart devices (e.g. smart devices, smart phones, tablets), computers (e.g. servers, laptops, etc.), inertial measurement units (IMUs), processing units, etc. may be implemented with a subset or superset of the below illustrated components.

In FIG. 3, a computing device 300 may include some, but not necessarily all of the following components: an applications processor/microprocessor 302, memory 304, a display 306, an image acquisition device 310, audio input/output devices 312, and the like. Data and communications from and to computing device 300 can be provided by via a wired interface 314 (e.g. dock, plug, controller interface to peripheral devices); miscellaneous rf receivers, e.g. a GPS/Wi-Fi/Bluetooth interface/UWB 316; an NFC interface (e.g. antenna or coil) and driver 318; RF interfaces and drivers 320, and the like. Also included in some embodiments are physical sensors 322 (e.g. (MEMS-based) accelerometers, gyros, magnetometers, pressure sensors, temperature sensors, bioimaging sensors etc.).

In various embodiments, computing device 300 may be a computing device (e.g. Apple iPad, Microsoft Surface, Samsung Galaxy Note, an Android Tablet); a smart phone (e.g. Apple iPhone, Google Pixel, Samsung Galaxy S); a portable computer (e.g. netbook, laptop, convertible), a media player (e.g. Apple iPod); a reading device (e.g. Amazon Kindle); a fitness tracker (e.g. Fitbit, Apple Watch, Garmin or the like); a headset or glasses (e.g. Meta Quest, HTC Vive, Sony PlaystationVR, Magic Leap, Microsoft HoloLens); a wearable device (e.g. Motiv smart ring, smart headphones); an implanted device (e.g. smart medical device), a point of service (POS) device, a server, an IMU provided by the assignee of the present patent disclosure, or the like. Typically, computing device 300 may include one or more processors 302. Such processors 302 may also be termed application processors, and may include a processor core, a video/graphics core, and other cores. Processors 302 may include processor from Apple (A14 Bionic, A15 Bionic), NVidia (Tegra), Intel (Core), Qualcomm (Snapdragon), Samsung (Exynos), ARM (Cortex), MIPS technology, a microcontroller, and the like. In some embodiments, processing accelerators may also be included, e.g. an AI accelerator, Google (Tensor processing unit), a GPU, or the like. It is contemplated that other existing and/or later-developed processors/microcontrollers may be used in various embodiments of the present invention.

In various embodiments, memory 304 may include different types of memory (including memory controllers), such as flash memory (e.g. NOR, NAND), SRAM, DDR SDRAM, or the like. Memory 304 may be fixed within computing device 300 and may also include removable memory (e.g. SD, SDHC, MMC, MINI SD, MICRO SD, SIM). The above are examples of computer readable tangible media that may be used to store embodiments of the present invention, such as computer-executable software code (e.g. firmware, application programs), security applications, application data, operating system data, databases or the like. Additionally, in some embodiments, a secure device including secure memory and/or a secure processor are provided. It is contemplated that other existing and/or later-developed memory and memory technology may be used in various embodiments of the present invention.

In various embodiments, display 306 may be based upon a variety of later-developed or current display technology, including LED or OLED displays and/or status lights; touch screen technology (e.g. resistive displays, capacitive displays, optical sensor displays, electromagnetic resonance, or the like); and the like. Additionally, display 306 may include single touch or multiple-touch sensing capability. Any later-developed or conventional output display technology may be used for embodiments of the output display, such as LED IPS, OLED, Plasma, electronic ink (e.g. electrophoretic, electrowetting, interferometric modulating), or the like. In various embodiments, the resolution of such displays and the resolution of such touch sensors may be set based upon engineering or non-engineering factors (e.g. sales, marketing). In some embodiments, display 306 may integrated into computing device 300 or may be separate. In some embodiments, display 306 may be in virtually any size or resolution, such as a 3K resolution display, a microdisplay, one or more individual status or communication lights, e.g. LEDs, or the like.

In some embodiments of the present invention, acquisition device 310 may include one or more sensors, drivers, lenses and the like. The sensors may be visible light, infrared, and/or UV sensitive sensors, ultrasonic sensors, or the like, that are based upon any later-developed or convention sensor technology, such as CMOS, CCD, or the like. In some embodiments of the present invention, image recognition algorithms, image processing algorithms or other software programs for operation upon processor 302, to process the acquired data. For example, such software may pair with enabled hardware to provide functionality such as: facial recognition (e.g. Face ID, head tracking, camera parameter control, or the like); fingerprint capture/analysis; blood vessel capture/analysis; iris scanning capture/analysis; otoacoustic emission (OAE) profiling and matching; and the like. In additional embodiments of the present invention, acquisition device 310 may provide user input data in the form of a selfie, biometric data, or the like.

In various embodiments, audio input/output 312 may include a microphone(s)/speakers. In various embodiments, voice processing and/or recognition software may be provided to applications processor 302 to enable the user to operate computing device 300 by stating voice commands. In various embodiments of the present invention, audio input 312 may provide user input data in the form of a spoken word or phrase, or the like, as described above. In some embodiments, audio input/output 312 may be integrated into computing device 300 or may be separate.

In various embodiments, wired interface 314 may be used to provide data or instruction transfers between computing device 300 and an external source, such as a computer, a remote server, a POS server, a local security server, a storage network, another computing device 300, an IMU, video camera, or the like. Embodiments may include any later-developed or conventional physical interface/protocol, such as: USB, micro USB, mini USB, USB-C, Firewire, Apple Lightning connector, Ethernet, POTS, custom interface or dock, or the like. In some embodiments, wired interface 314 may also provide electrical power, or the like to power source 324, or the like. In other embodiments interface 314 may utilize close physical contact of device 300 to a dock for transfer of data, magnetic power, heat energy, light energy, laser energy or the like. Additionally, software that enables communications over such networks is typically provided.

In various embodiments, a wireless interface 316 may also be provided to provide wireless data transfers between computing device 300 and external sources, such as computers, storage networks, headphones, microphones, cameras, IMUs or the like. As illustrated in FIG. 3, wireless protocols may include Wi-Fi (e.g. IEEE 802.11 a/b/g/n, WiMAX), Bluetooth, Bluetooth Low Energy (BLE) IR, near field communication (NFC), ZigBee, Ultra-Wide Band (UWB), Wi-Fi, mesh communications, and the like.

GNSS (e.g. GPS) receiving capability may also be included in various embodiments of the present invention. As illustrated in FIG. 3, GPS functionality is included as part of wireless interface 316 merely for sake of convenience, although in implementation, such functionality may be performed by circuitry that is distinct from the Wi-Fi circuitry, the Bluetooth circuitry, and the like. In various embodiments of the present invention, GPS receiving hardware may provide user input data in the form of current GPS coordinates, or the like, as described above.

Additional wireless communications may be provided via RF interfaces in various embodiments. In various embodiments, RF interfaces 320 may support any future-developed or conventional radio frequency communications protocol, such as CDMA-based protocols (e.g. WCDMA), GSM-based protocols, HSUPA-based protocols, G4, G5, or the like. In some embodiments, various functionality is provided upon a single IC package, for example the Marvel PXA330 processor, and the like. As described above, data transmissions between a smart device and the services may occur via Wi-Fi, a mesh network, 4G, 5G, or the like.

Although the functional blocks in FIG. 3 are shown as being separate, it should be understood that the various functionality may be regrouped into different physical devices. For example, some processors 302 may include the Bluetooth functionality. Additionally, some functionality need not be included in some blocks, for example, GPS functionality need not be provided in a physical device implementing other functions illustrated in block 316.

In various embodiments, any number of future developed, current operating systems, or custom operating systems may be supported, such as iPhone OS (e.g. iOS), Google Android, Linux, Windows, MacOS, or the like. In various embodiments of the present invention, the operating system may be a multi-threaded multi-tasking operating system. Accordingly, inputs and/or outputs from and to display 306 and inputs/or outputs to physical sensors 322 may be processed in parallel processing threads. In other embodiments, such events or outputs may be processed serially, or the like. Inputs and outputs from other functional blocks may also be processed in parallel or serially, in other embodiments of the present invention, such as acquisition device 310 and physical sensors 322.

In some embodiments of the present invention, physical sensors 322 (e.g. MEMS-based) may include accelerometers, gyros, magnetometers, pressure sensors, temperature sensors, imaging sensors (e.g. blood oxygen, heartbeat, blood vessel, iris data, etc.), thermometer, otoacoustic emission (OAE) testing hardware, and the like. The data from such sensors may be used to capture data associated with device 300, and a user of device 300. Such data may include physical motion data, pressure data, orientation data, or the like. Data captured by sensors 322 may be processed by software running upon processor 302 to determine characteristics of the user, e.g. gait, gesture performance data, or the like and used for user authentication purposes. In some embodiments, sensors 322 may also include physical output data, e.g. vibrations, pressures, and the like.

In some embodiments, a power supply 324 may be implemented with a battery (e.g. LiPo), ultracapacitor, or the like, that provides operating electrical power to device 300. In various embodiments, any number of power generation techniques may be utilized to supplement or even replace power supply 324, such as solar power, liquid metal power generation, thermoelectric engines, rf harvesting (e.g. NFC) or the like.

FIG. 3 is representative of components possible for a processing device, an IMU, an video camera source, and the like for embodying different embodiments. It will be readily apparent to one of ordinary skill in the art that many other hardware and software configurations are suitable for use with the present invention. Embodiments of the present invention may include at least some but need not include all of the functional blocks illustrated in FIG. 3. For example, a smart phone (e.g. processing unit/video camera) may include some, but not all of the illustrated functionality. As another example, an IMU, may include some of the functional blocks in FIG. 3, but it need not include a high-resolution display 330 or a touch screen, a speaker/microphone 360, a video camera or the like.

Further embodiments can be envisioned to one of ordinary skill in the art after reading this disclosure. For example, in some embodiments, IMU markers may be identified via a series of periodic outputs, e.g. Morse code. As an example, a first IMU marker may have a blinking output light pattern of .----; a second IMU ..---; a third IMU ...---; and the like. In another example, IMU markers may be identified via a series of colors in a pattern, and the like. In other embodiments, the biomechanical optimization analysis may also be used to estimate the location of the IMU along a body segment (e.g. a portion of the subject body) as well. For example, an analysis may be performed to facilitate determination whether the IMU is positioned on the forearm 10 cm from the wrist versus 20 cm from the wrist, or the like. In some embodiments, actual measurements may be manually performed and input to the system. Additional embodiments may be used to automatically determine the lengths of the body segments of the subject to use for the biomechanical model.

The block diagrams of the architecture and flow charts are grouped for ease of understanding. However, it should be understood that combinations of blocks, additions of new blocks, re-arrangement of blocks, and the like are contemplated in alternative embodiments of the present invention. The specification and drawings are, accordingly, to be regarded in an illustrative rather than a restrictive sense. It will, however, be evident that various modifications and changes may be made thereunto without departing from the broader spirit and scope of the invention as set forth in the claims.

We claim:

1. A method comprising:
   while a user is positioned in an arbitrary position:
      acquiring, with a first inertial measurement unit disposed upon a first portion the user, a first plurality of acceleration data and a first plurality of magnetic data;
      acquiring, with a second inertial measurement unit disposed upon a second portion the user, a second plurality of acceleration data and a first plurality of magnetic data; and
      acquiring, with an image acquisition device, a plurality of image data of the user including the first portion of the user and the second portion of the user;
   determining, with the first inertial measurement unit, first gravity data of the first inertial measurement unit with respect to gravity;
   determining, with the first inertial measurement unit, first magnetic orientation data of the first inertial measurement unit with respect to a global magnetic field;
   determining, with the second inertial measurement unit, second gravity data of the second inertial measurement unit with respect to gravity;
   determining, with the second inertial measurement unit, second magnetic orientation data of the second inertial measurement unit with respect to the global magnetic field;
   determining, with a processing unit coupled to the image acquisition device, an orientation of the first portion of the user in space and an orientation of the second portion of the user in space;
   determining, with the processing unit coupled to the first inertial measurement unit, a calibration orientation of the first inertial measurement unit in space in response to the first gravity data, the first magnetic orientation data, and the orientation of the first portion of the user in space; and
   determining, with the processing unit coupled to the second inertial measurement unit, a calibration orientation of the second inertial measurement unit in space in response to the second gravity data, the second magnetic orientation data, and the orientation of the second portion of the user in space.

2. The method of claim 1 further comprising:
   while the user is positioned in another arbitrary position:
      acquiring, with the first inertial measurement, a third plurality of acceleration data and a third plurality of magnetic data; and
   determining, with the processing unit, another orientation of the first inertial measurement unit in space in response to the third gravity data, the third magnetic orientation data, and the calibration orientation of the first inertial measurement unit.

3. The method of claim 1 wherein the determining, with the processing unit coupled to the image acquisition device, the calibration orientation of the first portion of the user in space and the calibration orientation of the second portion of the user in space comprises:
- determining, with the processing unit, first marker data associated with the first inertial measurement unit disposed upon the first portion of the user in response to the plurality of image data;
- determining, with the processing unit, second marker data associated with the second inertial measurement unit disposed upon the second portion of the user in response to the plurality of image data;
- determining, with the processing unit, the calibration orientation of the first portion of the user in space in response to the first marker data and to a model of the user; and
- determining, with the processing unit, the calibration orientation of the second portion of the user in space in response to the second marker data and to the model of the user.

4. The method of claim 3 wherein the determining, with the processing unit, the calibration orientation of the first portion of the user in space comprises:
- determining, with the processing unit, an association between the first marker data and a first location on the model of the user; and
- determining, with the processing unit, the calibration orientation of the first portion of the user in space in response to the first location on the model of the user.

5. The method of claim 3 wherein the image acquisition device is selected from a group consisting of: multiple cameras, a camera having a micro lens array, and a lidar sensor.

6. The method of claim 3
- wherein the image acquisition device comprises two video cameras;
- wherein the method further comprises determining depth data in response to the plurality of image data; and
- wherein the determining, with the processing unit, the first marker data associated with the first inertial measurement comprises determining, with the processing unit, the first marker data in response to the depth data.

7. The method of claim 1 further comprising:
- transmitting, via a first communications channel from the first inertial measurement unit to the processing unit, the first gravity data and the first magnetic orientation data;
- wherein the first communications channel is selected from a group consisting of: wired channel, USB, wireless channel, Bluetooth, UWB, and ZigBee.

8. The method of claim 1
- wherein the user is positioned in the arbitrary position for a period of time;
- wherein the first plurality of acceleration data and the first plurality of magnetic data are acquired during the period of time; and
- wherein the plurality of image data of the user are acquired during the period of time.

9. The method of claim 8 wherein the determining, with the first inertial measurement unit, first gravity data of the first inertial measurement unit with respect to gravity comprises filtering, with the first inertial measurement unit, the first plurality of acceleration data.

10. The method of claim 1 further comprising:
- wirelessly transmitting, from a first short-range transceiver of the first inertial measurement unit to the processing unit, the first gravity data and the first magnetic orientation data; and
- wirelessly transmitting, from a second short-range transceiver of the second inertial measurement unit to the processing unit, the second gravity data and the second magnetic orientation data.

11. A motion capture system includes
- a first inertial measurement unit disposed upon a first portion the user, wherein the first inertial measurement unit includes a first visual marker, wherein the first inertial measurement unit is configured to acquire a first plurality of acceleration data and a first plurality of magnetic data during a period of time, wherein the first inertial measurement unit is configured to determine first gravity data in response to the first plurality of acceleration data, configured to determine first magnetic orientation data in response to the first plurality of magnetic data, and configured to wirelessly output the first magnetic orientation data and the first plurality of magnetic data to a processing unit;
- a second inertial measurement unit disposed upon a second portion the user, wherein the second inertial measurement unit includes a second visual marker, wherein the second inertial measurement unit is configured to acquire a second plurality of acceleration data and a second plurality of magnetic data during the period of time, wherein the second inertial measurement unit is configured to determine second gravity data in response to the second plurality of acceleration data, and configured to determine second magnetic orientation data in response to the second plurality of magnetic data, and configured to wirelessly output the second magnetic orientation data and the second plurality of magnetic data to the processing unit;
- an image acquisition device configured to acquire a plurality of image data of the user including the first portion of the user and the first visual marker and the second portion of the user and the second visual marker during the period of time; and
- a processing unit coupled to the first inertial measurement unit, the second inertial measurement unit, and to the image acquisition device, wherein the processing unit is configured to determine a pose of the user in response to the plurality of image data, wherein the processing unit is configured to determine first calibration data associated with the first inertial measurement unit in response to the first magnetic orientation data, the first plurality of magnetic data, and the pose of the user, and wherein the processing unit is configured to determine second calibration data associated with the second inertial measurement unit in response to the second magnetic orientation data, the second plurality of magnetic data, and the pose of the user.

12. The system of claim 11
- wherein the first inertial measurement unit is configured to acquire a third plurality of acceleration data and a third plurality of magnetic data during another period of time;
- wherein the first inertial measurement unit is configured to determine third gravity data in response to the third plurality of acceleration data;
- wherein the first inertial measurement unit is configured to determine third magnetic orientation data in response to the third plurality of magnetic data;
- wherein the first inertial measurement unit is configured to wirelessly output the third gravity data and the third magnetic orientation data to the processing unit;

wherein the processing unit is configured to determine another pose of the user in response to the third gravity data, the third magnetic orientation data, and the first calibration data.

13. The system of claim 11 wherein the processing unit is configured to determine a first image position on the plurality of image data that is associated with the first visual marker of the first inertial measurement unit in response to the plurality of image data; and wherein the processing unit is configured to determine the pose of the user in response to the first image position.

14. The system of claim 13 wherein the processing unit is configured to determine the pose of the user in response to the first image position and to a model of the user.

15. The system of claim 14 wherein the processing unit is configured to perform a biomechanical optimization analysis to determine the pose in response to the first image position and the model of the user.

16. The system of claim 11 wherein the first inertial measurement unit comprises a short-range transmitting unit configured to wirelessly output the first magnetic orientation data and the first plurality of magnetic data to a processing unit;

wherein the short-range transmitting unit is selected from a group consisting of: Bluetooth, UWB, and Zigbee.

17. The system of claim 11 wherein the processing unit and the image acquisition device are integrated within a smart device.

18. The system of claim 11 wherein the image acquisition device is selected from a group consisting of: multiple cameras, a camera having a micro lens array, and a lidar sensor.

19. The system of claim 11 wherein the image acquisition device comprises two video cameras;

wherein the processing unit is configured to determine depth data in response to the plurality of image data; and wherein the processing unit is configured to determine the pose of the user in response to the plurality of depth data.

20. The system of claim 11 wherein the first visual marker is disposed upon a surface of the first inertial measurement unit and is selected from a group consisting of: a two-dimensional visual pattern, a light source, a colored-light source, and a visual pattern displayed upon a display screen disposed upon the first visual marker.

* * * * *